United States Patent
Cator et al.

[11] 3,742,831
[45] July 3, 1973

[54] BATTERY CHECKER FOR CAMERAS

[75] Inventors: Edward J. Cator, Naples; William P. Ewald, New York, both of N.Y.

[73] Assignee: Eastman Kodak Company, Rochester, N.Y.

[22] Filed: July 26, 1972

[21] Appl. No.: 275,607

Related U.S. Application Data
[63] Continuation of Ser. No. 234,589, March 14, 1972, abandoned.

[52] U.S. Cl. ............. 95/10 CE, 95/64 D, 352/141, 356/218
[51] Int. Cl. ....... G03b 7/08, G01j 1/42, G03b 17/18
[58] Field of Search............. 95/10 C, 10 CE, 64 R, 95/64 D; 356/218, 227; 352/141

[56] References Cited
UNITED STATES PATENTS
| | | | |
|---|---|---|---|
| 3,517,599 | 6/1970 | Sapp, Jr. et al. | 95/64 D |
| 3,459,113 | 8/1969 | Fallenberg | 95/64 D |
| 3,452,347 | 6/1969 | Stimson | 352/141 |

*Primary Examiner*—Joseph F. Peters, Jr.
*Attorney*—W. H. J. Kline

[57] ABSTRACT

Battery checking apparatus for cameras including a photoresponsive element and galvanometer operative for moving a signal vane into and out of a viewable position in a viewfinder in accordance with the intensity of the ambient light, and a light-emitting diode placed adjacent to the photoresponsive element and connectable in circuit with a camera battery. The apparatus is effective when the battery is to be checked for connecting the battery-diode circuit and for blocking ambient light from striking the photoresponsive element so that the photoresponsive element is illuminated only by the light from the light-emitting diode. The movement of the light level indicator relative to the viewfinder is thus an indication of the light emission from the light-emitting diode, and is therefore an indication of the battery power condition. Circuitry is provided for varying the voltage applied to the light-emitting diode from the battery.

4 Claims, 3 Drawing Figures

PATENTED JUL 3 1973
3,742,831
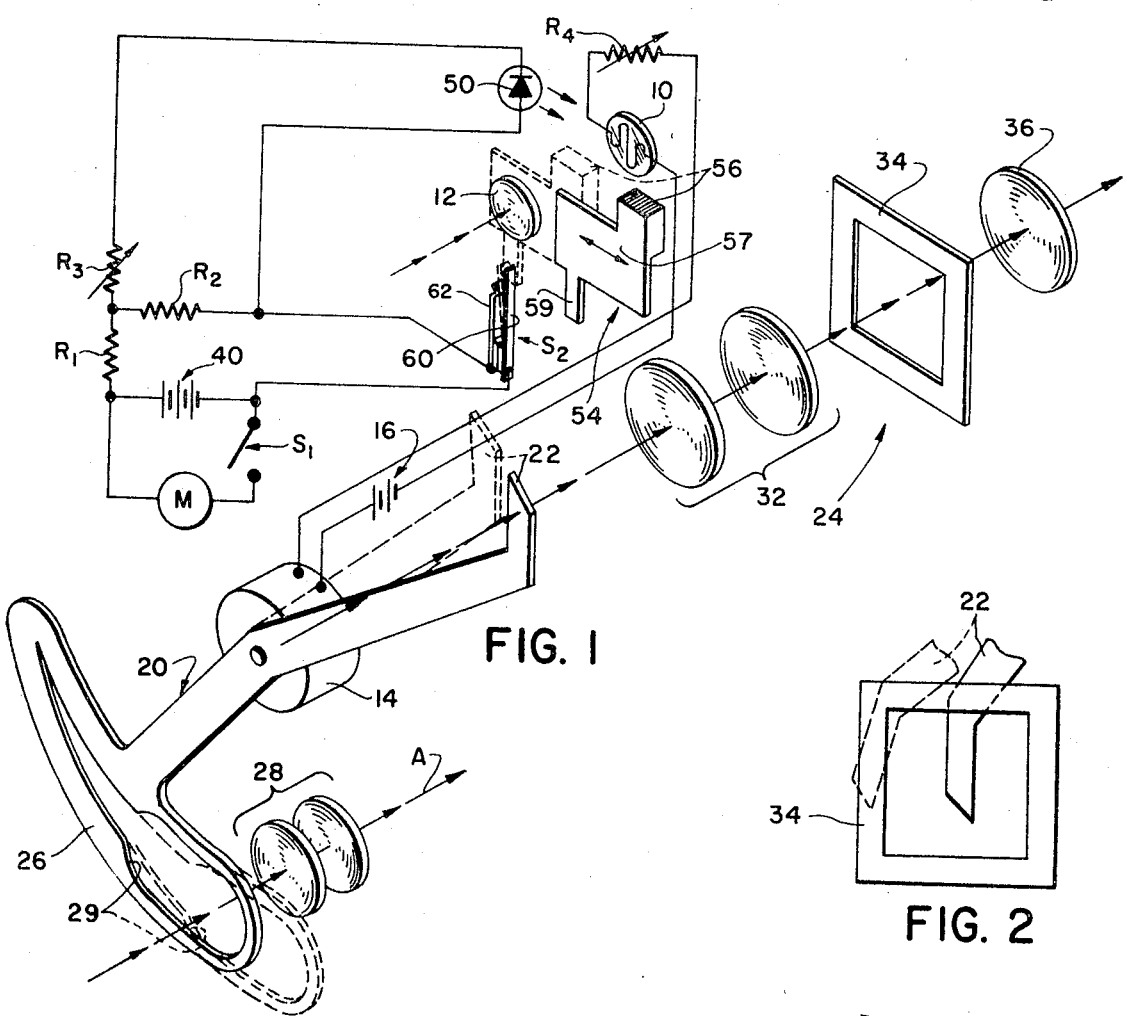
FIG. 1
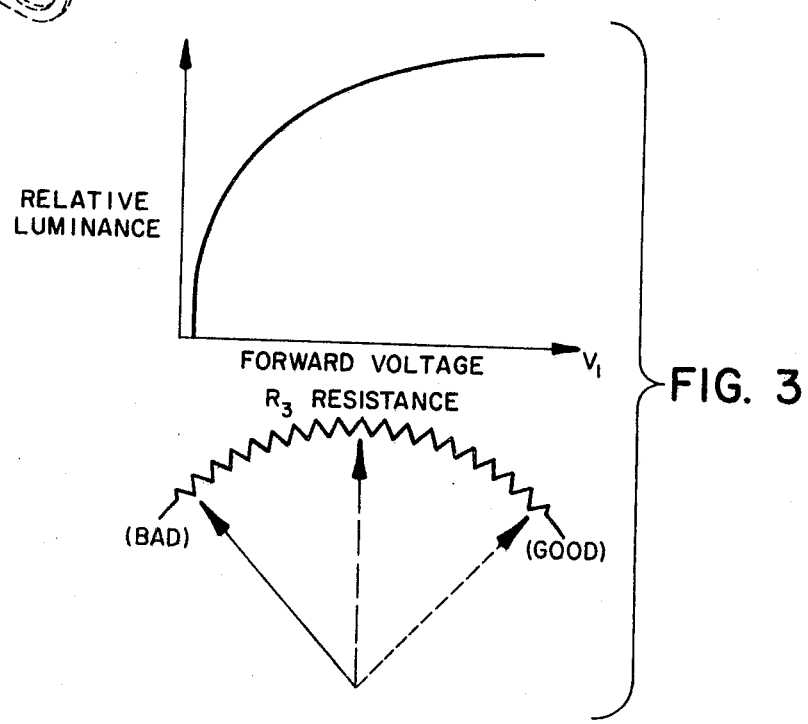
FIG. 2
FIG. 3

BATTERY CHECKER FOR CAMERAS

This application is a continuation of application Ser. No. 234,589, filed Mar. 14, 1972, and now abandoned.

BACKGROUND OF THE INVENTION

1. Field of the Invention

This invention is related to a battery checker for cameras and more particularly to an arrangement for checking batteries by using a photoresponsive element and galvanometer in conjunction with a light-emitting diode.

2. Description of the Prior Art

As is well known, most modern types of cameras, both still and movie, utilize one or more batteries for powering the several different operations of the camera such as lens adjustment and/or shutter adjustment, automatic film advance and rewind, and flash bulb energization, or the like. These batteries are often of special design for the respective purposes and are positioned in the cameras so unobtrusively and operate with such effectiveness that they tend to be taken for granted by the user and be forgotten. This performance is, of course, highly desirable from a standpoint of the operator. Unfortunately, the batteries on occasion fail or weaken due to age or use, and when such conditions are not detected by the user, film wastage and picture failures may well result. It is desirable therefore that some means for checking the batteries be provided in the camera. It is particularly important when the battery is powering a small motor for film winding that a predetermined minimum of voltage be maintained.

While battery checking arrangements have previously been provided in certain types of cameras, they have in many instances provided a go, no-go battery check or require the operator's eye to integrate light from an indicator lamp to determine battery condition. It has been suggested that metering such as a galvanometer be connected in circuit with the battery to register the battery voltage condition; however, it is known that a battery may have a requisite voltage reading across its terminals yet cannot supply power to camera equipment, i.e., it immediately fails under load. This is primarily due to the fact that metering does not sufficiently load the battery during the checking operation. Further, the scale of the battery-metering system cannot be expanded to an appropriate size within the camera structure to detect minute voltage changes in the battery, such as for example a change of 0.1 volts in a 3-volt battery.

SUMMARY OF THE INVENTION

Accordingly, it is an object of the present invention to provide improved battery checking apparatus for use in cameras for providing a measure of the battery power level.

A more specific object of the present invention is to indicate the voltage condition of the battery by use of the camera light level indicator apparatus and a light-emitting diode.

Still another object is to provide a battery checker for a camera which provides indication of battery power at various levels of battery condition and provides a positive indication of when the battery power level may be expected to reach a predetermined minimum level.

In accordance with one illustrative embodiment of the invention, a camera includes a photoresponsive element exposed to ambient light, a galvanometer operatively coupled in circuit therewith for providing deflection of the galvanometer in accordance with the intensity of the ambient light, and means for indicating the amount of deflection of the galvanometer. The camera includes a battery for powering operations of the camera and further provides light-emitting semiconductor means connectable in circuit with the battery, the light-emitting means being disposed adjacent to the photoresponsive element, and having the property that no light emission occurs when a forward voltage applied to the light emitting means from the battery is below a predetermined voltage level and that the emission increases rapidly as the applied forward voltage increases above the predetermined value. The camera includes means for connecting the battery in circuit with the light-emitting means which is also effective for blocking the ambient light incident onto the photoresponsive element so that the photoresponsive element is illuminated solely by the light-emitting means, and the deflection of the galvanometer is therefore indicative of the power available in the battery.

The apparatus of the present invention may include a light-emitting diode disposed adjacent to the photoresponsive element for providing light in accordance with the power level of the battery, and circuit means for adjusting battery voltage above and below the predetermined level for providing an indication of battery power remaining before the battery power level reaches the predetermined level.

BRIEF DESCRIPTION OF THE DRAWINGS

The invention, the objects and advantages will become apparent in the detailed description of the preferred embodiment presented below in conjunction with the accompanying drawings in which;

FIG. 1 is a schematic view in partial perspective of a battery checking arrangement in accordance with one illustrative embodiment of the invention shown in conjunction with ambient light measuring means and a view of a viewfinder assembly for use in conjunction with the apparatus;

FIG. 2 is a front view of the field mask of the viewfinder of FIG. 1 showing a signal vane viewable therein; and FIG. 3 is a graphic representation of the light-emission characteristics of a light-emitting semiconductor device of the present invention versus voltage between its terminals as a variable resistance in series therewith is varied.

DETAILED DESCRIPTION OF THE PREFERRED EMBODIMENT

Because photographic cameras are well known, the present description will be directed in particular to elements forming part of or cooperating more directly with the present invention, camera elements not specifically shown or described herein being understood to be selectable from those in the art.

Referring now to FIG. 1 there is shown apparatus of a camera which includes a photoresponsive element, such as a cadmium sulfide photocell 10, appropriately placed in the camera housing (not shown) to receive ambient scene light through a lens 12 or the photosensitive element may be a photovoltaic cell or the like, which generates current when exposed to light. The photocell 10 may be of the type having a resistance which varies inversely as the intensity of the received ambient light varies. When coupled in series circuit with a galvanometer 14 and a battery 16 (the battery 16 would not be required if the photocell 10 is replaced by a photovoltaic cell), the photocell 10 controls the amount of current from the battery 16 in accordance with its resistance to thereby cause a deflection of the galvanometer 14 which is related to the intensity of the ambient light. A movable arm 20 is operatively coupled to the galvanometer 14 for rotation either clockwise or counterclockwise, governed by the deflection of the galvanometer 14. The arm 20 terminates at one end in a signal vane 22 and at the other end in a diaphragm adjusting element 26. The diaphragm adjusting element 26 defines a tapered aperture 29 which is movable relative to a camera lens component 28 as the arm 20 rotates. The lens component 28 is optically aligned with the camera exposure axis (indicated by the arrows A) so that the amount of light admitted to the lens component 28 and thus transmitted along the exposure axis is determined by the position of the arm 20. At the same time that the tapered aperture 29 is movable relative to the lens component 28, the signal vane 22 is movable relative to a viewfinder assembly, designated generally as the numeral 24, to provide a camera operator with an indication of the level of the ambient scene light intensity. The viewfinder assembly 24 may include an objective lens (not shown), erecting lens component 32, a field mask 34, and an eyepiece 36. The viewfinder assembly 24 operates in the known manner for providing an erect image at the eye of an operator of an object in an object field. The signal vane 22 is operative as shown in FIG. 1 to be moved relative to the axis of the viewfinder for providing an image in the field mask 34 as the arm 20 rotates clockwise or counterclockwise. As shown by the dotted lines of FIG. 1, the signal vane 22 normally occupies a position of prominence in the field mask 34 and is moved out of view in accordance with the intensity of the ambient scene light.

In the preferred embodiment of the present invention, provision is made for utilizing the apparatus thus described for checking the power level (the capability of supplying a specified minimum charge per unit time at a specified voltage rating) of a camera battery 40 which may be used to perform the normal camera functions such as film wind or rewind. As shown in FIG. 1, the battery 40 is connectable to a motor M when a switch S1 is closed. The battery 40 is also connectable to a light-emitting diode 50 by means of a switch S2 and a voltage divider circuit comprising fixed resistors R1, R2, and a variable resistor R3. The light-emitting diode 50 may be any of the known devices which emit radiation in a particular portion of the spectrum when a predetermined voltage is applied across its terminals, and has the property that no light is emitted when the applied voltage is below a particular voltage level, but rises sharply as the voltage is increased above the particlar level. One such element may be a diode formed of galium arsenide phosphide which emits radiation from the green through infrared (5,600 to 9,000 angstroms) range of the spectrum. The diode 50 is conveniently placed in the camera adjacent to the photocell 10 so that light emitted from the diode 50 impinges upon the photocell 10. The apparatus includes a push button assembly 54 having a push button 56 which may be accessible from the camera exterior. The push button assembly 54 is slidably mounted in the camera housing, being normally held in a retracted inoperative position of FIG. 1 by the action of a restoring spring 58. The push button assembly 54 also includes a light shield 57 and a switch actuating arm 59.

To utilize the apparatus of the present invention to check the power level of the battery 40, the push button assembly 54 is moved to its advanced or operative position by finger pressure on push button 56, and temporarily held in that position against the restoring force of the spring 58. The movement of the push button assembly 54 may be lateral relative to the lens 12 as shown by the dotted lines of FIG. 1 for closing the battery-diode circuit by bringing the actuating arm 59 into contact with the switch S2 thereby moving a contact 60 into engagement with its opposing contact 62. The lateral movement also positions the light shield 57 between the lens 12 and the photocell 10 to block the transmission of ambient light through the lens 12 and onto the photocell 10. The photocell 10 is then illuminated solely by the light emitted from the diode 50, the intensity of which is governed by the value of the resistance R3 and the power level of the battery 40. The light impinging onto the photocell 10 produces current flow in the photocell-galvanometer circuit and consequently a deflection of the galvanometer 14 which is a function of the power level of the battery 40.

As pointed out above, the diode 50 has the unique characteristic that a sudden drop in light emission takes place when the applied forward voltage reaches a particular value. Based upon this characteristic, together with information concerning the output voltage range of the battery 40, a suitable adjustment of the resistors R1, R2, and R3 and a variable resistor R4 may be made to regulate the viewing position of the signal vane 22 relative to the viewfinder assembly 24 (field mask 34). For example, the adjustment may be such that for a diminished but still adequate battery power level, the signal vane 22 may just enter a viewing position of the field mask 34 as shown in FIG. 2. As the battery power level continues to decrease and there is a corresponding decrease in the illumination of the photocell 10 from the diode 50, the signal vane 22 will move further into the viewing position until, as also shown in FIG. 2, a full view of the signal vane 22 is visible as an arbitrarily designated low battery power condition. An accurate and reliable running account of the power level of the battery 40 is available to the camera user, even though the battery 40 may not have reached an entirely unsatisfactory condition. The signal vane 22 may have a preferred position which is normally in the viewing path and movable out of the viewing path depending upon the battery power available.

After completion of the battery check, finger pressure is removed and the push button assembly 54 is moved to its retracted position by the influence of the restoring spring 58. The diode-battery circuit is again open at the switch S2 and the photocell 10 is illuminated by ambient light as before.

The apparatus as thus described utilizes the diode 50 as a circuit element for providing a battery check by means of the movable signal vane 22. However, the diode 50 emits light in the green and yellow range of the spectrum, which makes the diode 50 appropriate for use as a viewable light indicator. Utilizing this fact, and the fact that the diode 50 does not emit light at a voltage below a particular level, the apparatus may be utilized to provide another feature of the present invention as described in the following paragraphs.

The diode 50 may be conveniently placed in relation to the viewfinder assembly 24 and to the photocell 10 so as to illuminate the photocell 10 when emitting light and also to be seen by the eye of an operator. The resistor R3 is in series circuit with the diode 50, and as it is varied affects the light emitted from the diode 50 in the manner shown in FIG. 3. FIG. 3 represents a logarithmic plot of emitted luminance VS forward applied voltage. The resistor R3 may be a reostat or the like having an associated pointer movable along a scale between a "bad" indication or a "good" indication as the resistance of resistor R3 is varied. By varying the resistor R3 an operator may determine, within certain limits, the expected remaining life of the battery 40. The curve of FIG. 3 shows the correspondence between the resistance of the resistor R3 and the light emitted from the diode 50.

By way of explanation, assume the battery 40 has a voltage rating of $V_1$ volts and is capable of supplying current to the circuit for a specified time under the load of resistor R3.

When the push button assembly 54 is operated, the operator observes the light from the diode 50 through the viewfinder 24 and rotates the resistor R3 about a resistance value where the light from the diode 50 becomes bright and then goes out. A battery that is capable of supplying a high charge-per-unit time requires a larger resistance to cause the diode 50 to cease to emit light, thus the pointer on the resistor R3 may show a "good" reading on a scale of the resistor R3. If the battery is incapable of supplying a larger charge per unit time due to age or use, the range of resistance R3 required to vary between the points where the diode 50 is bright and then does not emit light decreases until finally the pointer may indicate a "bad" reading on the scale of the resistor R3.

It will be apparent from the above description that a simple, efficient and economically suitable means has been provided for checking batteries in cameras. Since the checking arrangement utilizes portions of an already existing exposure control and/or ambient light monitoring means and viewfinder, it follows that provision of the battery checking means does not add appreciatively to the cost of the camera nor a serious space problem. The batteries checking arrangement takes advantage of, but does not interfere with, already existing functions of the camera. The novel utilization of a solid state device is particularly advantageous from the standpoint of easy mechanical assembly. Further, light-emitting filaments with their occasional breakage problems are eliminated.

The invention has been described in detail with particular reference to a preferred embodiment thereof but it will be understood that variations and modifications can be affected within the spirit and scope of the invention.

We claim:

1. In a camera of the type having means for receiving a battery, and battery checking apparatus including (1) a light-emitting element connectable in circuit with a received battery and having a light output proportional to the power of the received battery, (2) a photoresponsive element disposed to receive light from said light-emitting element, (3) a galvanometer operatively coupled in circuit with said photoresponsive element and proportionally deflectable in response to the intensity of light received by said photoresponsive element from said light-emitting element and (4) means responsive to a deflection of said galvanometer for indicating the power available in the received battery, the improvement comprising:

a variable impedance, connectable in circuit with the received battery and said light-emitting element, for varying said emitted light from said light-emitting element in proportion to the value of said impedence and the power available in the received battery.

2. The apparatus as recited in claim 1 wherein said light-emitting element comprises means having the property that power applied to said light-emitting element, below a predetermined level, produces no emitted light, but an increase in power applied, above said predetermined level, produces a rapid increase in emitted light.

3. The apparatus as claimed in claim 2 wherein said light-emitting means comprises a light-emitting diode.

4. The apparatus as recited in claim 3 wherein said impedence comprises a variable resistance, being variable such that said emitted light from said light-emitting diode becomes proportional to the power in the received battery and the set value of said variable resistance, so that said point where light emitted from said light-emitting diode increases rapidly, varies with the variations in resistance, for a given received battery power.

* * * * *